(12) United States Patent
Nishihara et al.

(10) Patent No.: US 8,033,364 B2
(45) Date of Patent: Oct. 11, 2011

(54) GAP ADJUSTING MECHANISM OF A WET BRAKE

(75) Inventors: Takashi Nishihara, Aichi (JP); Teruo Sanada, Tokyo (JP)

(73) Assignees: Kabushiki Kaisha Toyota Jidoshokki, Aichi-ken (JP); Akebono Brake Industry Co., Ltd., Tokyo (JP)

( * ) Notice: Subject to any disclaimer, the term of this patent is extended or adjusted under 35 U.S.C. 154(b) by 1007 days.

(21) Appl. No.: 11/983,356

(22) Filed: Nov. 7, 2007

(65) Prior Publication Data

US 2008/0121471 A1    May 29, 2008

(30) Foreign Application Priority Data

Nov. 27, 2006 (JP) .................. 2006-318716

(51) Int. Cl.
*F16D 55/02* (2006.01)
*F16D 13/75* (2006.01)

(52) U.S. Cl. ............... 188/71.7; 188/71.5; 188/196 M; 188/196 V; 192/111.1; 192/111.5; 192/70.251

(58) Field of Classification Search ............... 188/71.7, 188/71.5, 196 M, 196 V; 192/111.1, 111.5, 192/70.251
See application file for complete search history.

(56) References Cited

U.S. PATENT DOCUMENTS

| | | | | |
|---|---|---|---|---|
| 2,245,988 A | * | 6/1941 | Lambert | 188/72.2 |
| 2,835,357 A | * | 5/1958 | Heck et al. | 188/264 D |
| 2,938,607 A | * | 5/1960 | Kershner et al. | 188/72.8 |
| 2,981,376 A | * | 4/1961 | Zeidler | 188/71.5 |
| 4,352,415 A | * | 10/1982 | Powell | 188/156 |
| 4,499,976 A | * | 2/1985 | Weber | 188/71.9 |
| 5,020,643 A | * | 6/1991 | Redenbarger | 188/196 M |
| 6,082,504 A | * | 7/2000 | Organek et al. | 188/72.7 |

FOREIGN PATENT DOCUMENTS

| | | |
|---|---|---|
| DE | 20014539 U1 | 1/2001 |
| EP | 1 498 634 | 1/2005 |
| GB | 2 075 623 A | 11/1981 |
| JP | 57-1831 A | 1/1982 |
| JP | 9-112604 | 5/1997 |
| JP | 2005-030457 | 2/2005 |
| WO | 2005/038287 A1 | 4/2005 |

OTHER PUBLICATIONS

Japanese Official Notification for Application No. 2006-318716, dated Jul. 20, 2010.
Extended European Search Report issued Feb. 25, 2009, for European Patent Application No. 07118506.0.

* cited by examiner

*Primary Examiner* — Bradley King
*Assistant Examiner* — Mahbubur Rashid
(74) *Attorney, Agent, or Firm* — Locke Lord Bissell & Liddell LLP

(57) ABSTRACT

By rotating a regulating bolt about an axis thereof to move forward/backward with respect to a protrusion portion, a lever is rotated about a shaft portion of an adjusting member. Therefore, the shaft portion of an adjusting member is rotated together with the lever to adjust a gap formed between a disk and a piston. After the gap is adjusted, the regulating bolt is fastened owing to a lock nut and a screw hole of the protrusion portion to thereby fix an forward/backward position of the regulating bolt with respect to the protrusion portion. In addition, a fixing bolt is screwed into a screw hole of a second housing portion to thereby fix a rotational position of the lever. Accordingly, the rotational position of the lever is double-locked.

6 Claims, 4 Drawing Sheets

GAP ADJUSTING MECHANISM OF A WET BRAKE

BACKGROUND OF THE INVENTION

1. Field of the Invention

The present invention relates to a gap adjusting mechanism of a wet brake. In particular, the present invention relates to a mechanism for adjusting a gap formed between a disk and a piston in a wet brake.

2. Description of the Related Art:

Up to now, in an industrial vehicle such as a forklift, there is employed a wet brake having a disk rotating together with a wheel. The disk is disposed between a pressure receiving surface and a piston arranged in a brake housing, and the piston pressurizes the disk to apply a friction force to the disk, thereby braking the wheel.

In the wet brake as described above, in general, it is known that wearing of a disk surface causes changes in a gap formed between the piston and the disk. In order to eliminate actuation delay or the like of a brake caused by the changes of the gap, a mechanism for adjusting the gap has been proposed.

For example, in JP 9-112604 A, a gap adjusting mechanism including an adjusting bolt screwed into a screw hole of a brake housing is disclosed. A tip end portion of the adjusting bolt is abutted against a surface of a piston opposite to a disk, and the adjusting bolt is rotated to move a position of the piston with respect to the disk, to thereby adjust the gap formed between the piston and the disk.

However, in the gap adjusting mechanism disclosed in JP 9-1112604 A, there is a fear in that vibration or the like may lead the adjusting bolt to rotate. In a case where the adjusting bolt rotates and the gap value formed between the piston and the disk varies from an adjusted value, there is a fear of causing problems such as the actuation delay and dragging of the brake.

SUMMARY OF THE INVENTION

The present invention has been made to solve the above-mentioned problems. Therefore, it is an object of a present invention to provide a gap adjusting mechanism of a wet brake capable of maintaining a gap formed between a disk and a piston at an adjusted value.

The gap adjusting mechanism of a wet brake according to the present invention includes:

an adjusting member rotatably mounted to a housing of the wet brake;

gap adjusting means engaged with the adjusting member for adjusting a gap formed between a disk and a piston of the wet brake owing to rotation of the adjusting member;

a lever fixed to the adjusting member, the lever rotating together with the adjusting member;

a regulating bolt screwed into a screw hole formed in the housing, the regulating bolt moving forward/backward with respect to the screw hole by being rotated about an axis thereof for regulating a rotational position of the lever with a tip end portion of the regulating bolt abutting against the lever in a rotational direction of the lever;

a regulating bolt fixing member for fixing an forward/backward position of the regulating bolt with respect to the screw hole; and a lever fixing member for fixing a rotational position of the lever with respect to the housing.

DETAILED DESCRIPTION OF THE PREFERRED EMBODIMENTS

Hereinafter, embodiments of the present invention will be described with reference to the accompanying drawings.

First Embodiment

Figure 1:
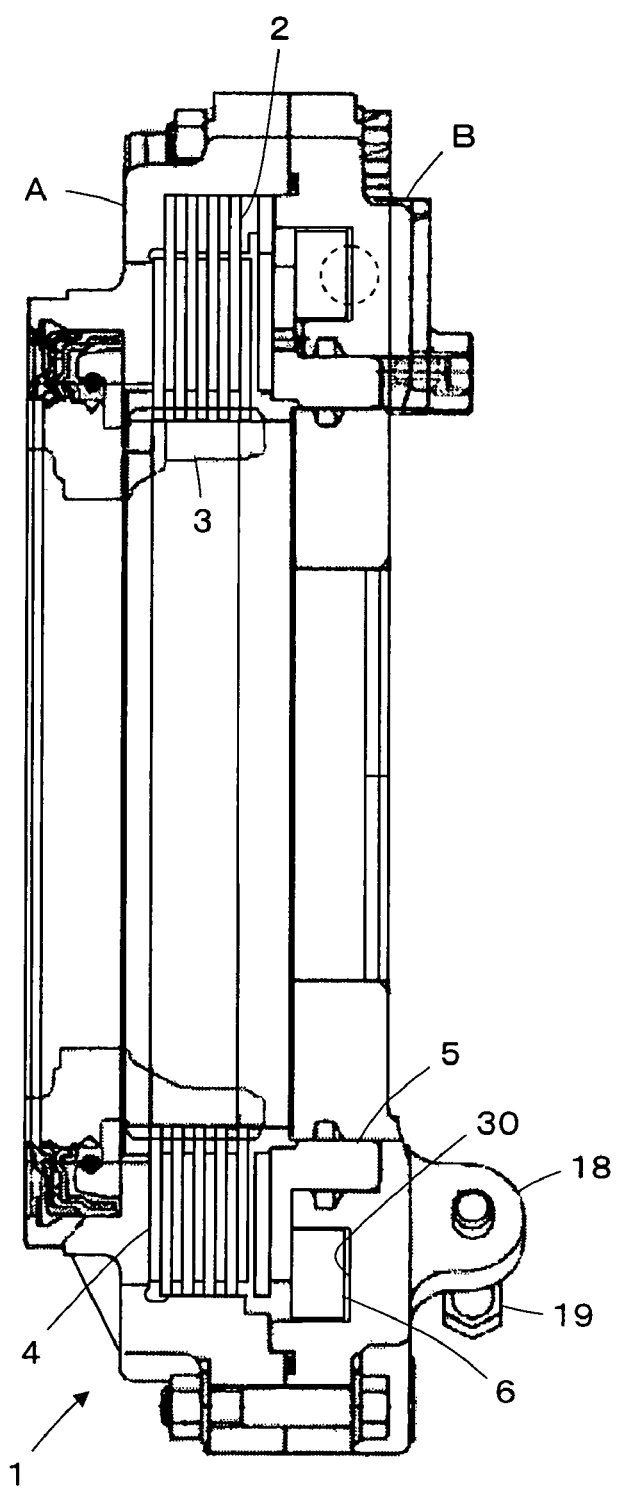
FIG. 1 is a cross-sectional view showing a wet brake equipped with a gap adjusting mechanism according to a first embodiment of the present invention.

FIG. 1 shows a wet brake equipped with a gap adjusting mechanism according to a first embodiment of the present invention. The wet brake is used, for example, for braking traveling wheels of a forklift or the like. The wet brake includes a housing 1 which is mounted to a machine base of the forklift. The housing 1 includes a first housing portion A and a second housing portion B which are integrally fixed to each other to form a substantially-cylindrical shape together. A through hole is formed at a center of each of the first housing portion A and the second housing portion B.

On a surface of the first housing portion A opposed to the second housing portion B, a ring-type stepped portion is formed in the periphery of the through hole thereof. In the stepped portion, a plurality of ring-type pressure plates 2 are disposed along an axial direction of the through hole and spaced apart from each other at predetermined intervals. In the through hole of the first housing portion A, an axle member 3 coupled to a wheel (not shown) is rotatably provided. On the outer periphery of the axle member 3, a plurality of ring-type disks 4 are mounted so that the plurality of disks 4 and the plurality of pressure plates 2 are alternately provided one by one. The axle member 3 is connected to the wheel (not shown) When the machine base travels, the axle member 3 and the plurality of disks 4 are rotated together with the wheel.

On a surface of the second housing portion B opposed to the first housing portion A, a piston chamber is formed. In the piston chamber, a piston 5 is inserted. The piston 5 is opposed to the disks 4, and is slidably disposed in an axial direction thereof. Further, on the surface of the second housing portion B opposed to the first housing portion A, a ring-type recess 30 is formed along a circumferential direction of the through hole. Inside the ring-type recess 30, a ring-type positioning plate 6 is disposed slidably in an axial direction thereof and rotatably in a circumferential direction thereof.

Figure 2:
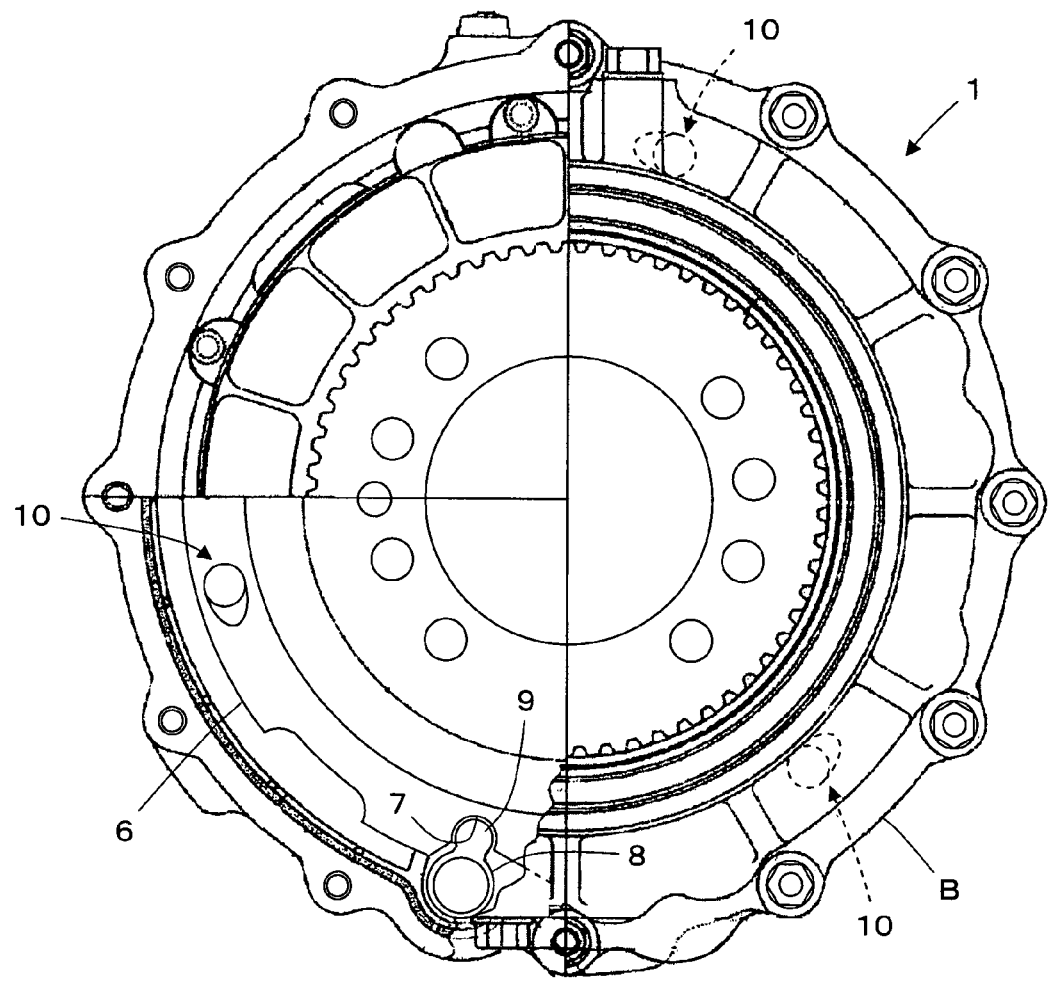
FIG. 2 is a partially-cutout frontal view showing the wet brake equipped with the gap adjusting mechanism according to the first embodiment of the present invention.

As shown in FIG. 2, at a predetermined position of the positioning plate 6 in the circumferential direction, a substantially-arc-shaped cutout 7 is formed. An arc-shaped convex portion 9 provided to an adjusting member 8, which is to be described later, is engaged with the cutout 7. Further, at positions of the positioning plate 6 different from a position of the cutout 7 in the circumferential direction, gap forming members 10 are provided. For example, three gap forming members 10 are arranged in the circumferential direction of the positioning plate 6 at identical intervals.

Figure 3:
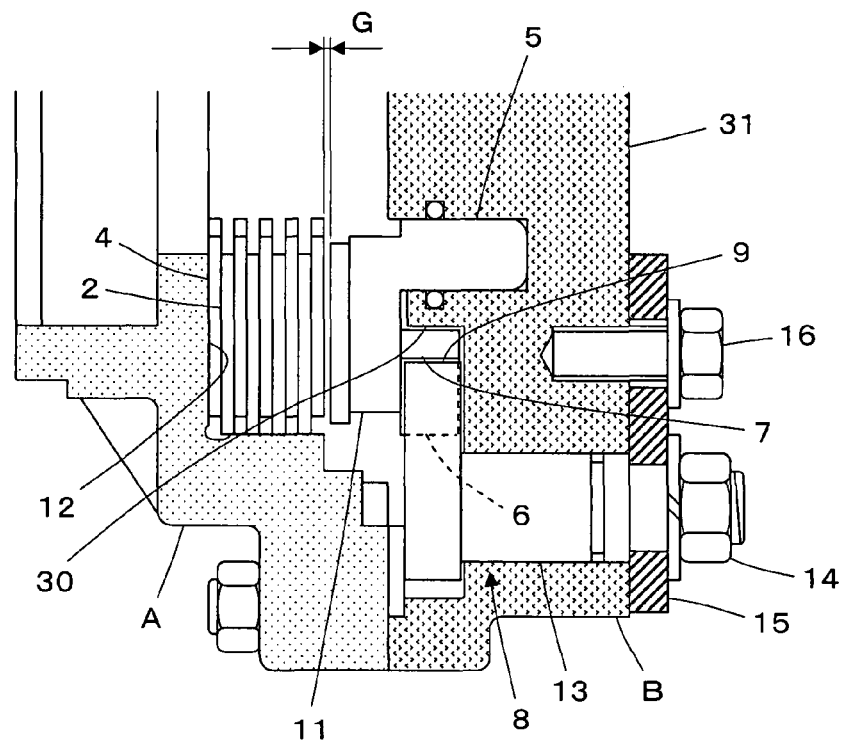
FIG. 3 is an enlarged cross-sectional view showing a structure in the vicinity of an adjusting member in the first embodiment of the present invention.

As shown in FIG. 3, the piston 5 includes a projection portion 11 projecting out sideways with respect to a movement direction of the piston 5, and the projection portion 11 is located between the disks 4 and the positioning plate 6. The projection portion 11 is urged toward the second housing portion B by a return spring (not shown). When pressure oil is injected into the piston chamber through an oil path (not shown), the piston 5 moves toward the disks 4 against the urging force of the return spring. Then, the piston 5 pressurizes the plurality of pressure plates 2 and the plurality of disks 4 to a pressure receiving surface 12 of the first housing portion A. Thus, a friction force generates between the pressure plates 2 and the disks 4 to brake the wheel. Meanwhile, when pressure oil is discharged from the piston chamber, owing to the urging force of the return spring, the piston 5 moves toward the second housing portion B to be spaced apart from the disks 4. Then, when the projection portion 11 of the piston 5 abuts against the positioning plate 6, the piston 5 stops. As described above, by the existence of the positioning plate 6, a return position of the piston 5 is regulated. That is, a gap G formed between the disks 4 and the piston 5 is regulated owing to the positioning plate 6.

To the second housing portion B, the adjusting member 8 for adjusting the gap G is mounted. The adjusting member 8 includes a columned shaft portion 13 penetrating the second housing portion B in an axial direction of the second housing portion B. The shaft portion 13 is rotatably disposed about an axis thereof. An end portion of the shaft portion 13 is located inside the second housing portion B to be opposed to the first housing portion A. The convex portion 9 is formed on the end portion of the shaft portion 13 so as to protrude in a radial direction of the shaft portion 13 in an arc manner. The convex portion 9 is engaged with the cutout 7 of the positioning plate 6. Meanwhile, the other end portion of the shaft portion 13 is arranged so as to externally protrude from a surface 31 of the second housing portion B opposite to the first housing portion A. To the other end portion of the shaft portion 13, a lever 15 is fixed through a fixing nut 14 perpendicularly to the shaft portion 13, so that the lever 15 can rotate together with the shaft portion 13. The lever 15 can be fixed to the second housing portion B by using a fixing bolt 16.

Figure 4:
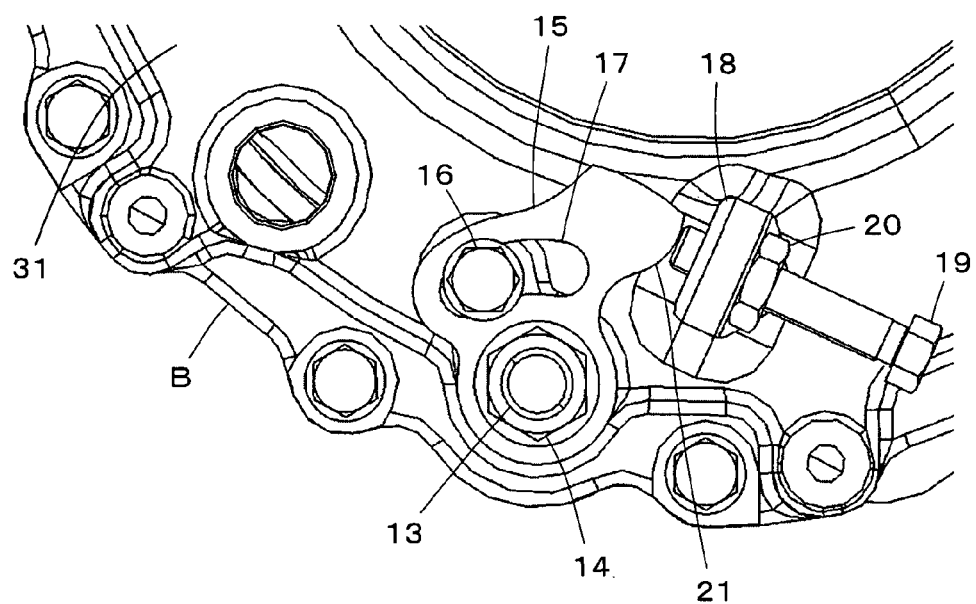
FIG. 4 is an enlarged front view showing a structure in the vicinity of a lever in the first embodiment of the present invention.

As shown in FIG. 4, the lever 15 elongates in the radial direction of the shaft portion 13 to have a predetermined shape, and disposed so as to rotate about the shaft portion 13. Further, on the lever 15, an arc-shaped slot 17 is formed, the shaft portion 13 being a center of the arc. The fixing bolt 16 is inserted into the slot 17 to be screwed into a screw hole formed on the surface 31 of the second housing portion B. Accordingly, a rotational position of the lever 15 with respect to the second housing portion B is fixed.

Further, as shown in FIGS. 1 and 4, on the surface 31 of the second housing portion B, a protrusion portion 18 protruding in an axial direction of the housing 1 is formed. On the protrusion portion 18, a screw hole is penetratingly formed. The screw hole is arranged in parallel with the surface 31 of the second housing portion B on which the protrusion portion 18 is provided. A regulating bolt 19 is screwed into the screw hole of the protrusion portion 18. When a base end portion of the regulating bolt 19 is operated to rotate the regulating bolt 19 about an axis thereof, the regulating bolt 19 moves forward/backward with respect to the protrusion portion 18.

Further, a lock nut 20 is screwed onto the regulating bolt 19. The regulating bolt 19 is fastened owing to both the lock nut 20 and the screw hole of the protrusion portion 18. By employing such a double-nut structure, a forward/backward position of the regulating bolt 19 with respect to the protrusion portion 18 can be fixed. Further, a tip end portion of the regulating bolt 19 protrudes from the screw hole of the protrusion portion 18, and abuts against an end surface 21 of the lever 15 in a rotational direction of the lever 15. Owing to the regulating bolt 19, the rotational position of the lever 15 is regulated.

Note that the end surface 21 of the lever 15 has an arc shape so that the tip end portion of the regulating bolt 19 abuts against the end surface 21 of the lever 15 vertically irrespective of the rotational position of the lever 15.

Figure 5A:
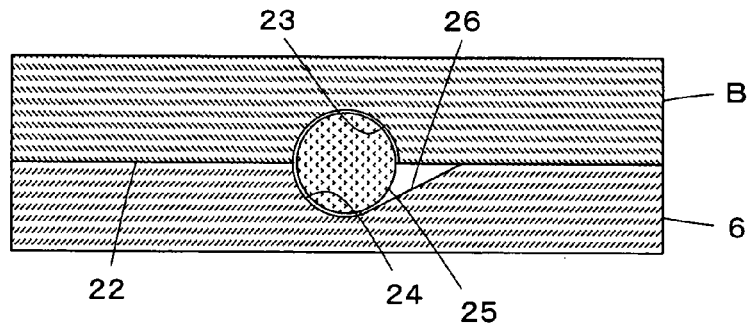
FIGS. 5A and 5B are enlarged cross-sectional views each showing a gap forming member in the first embodiment of the present invention.

As shown in FIG. 5A, the gap forming member 10 includes a hemispherical first concave portion 23, a second concave portion 24, and a ball body 25 arranged between the first concave portion 23 and the second concave portion 24. The first concave portion 23 is formed on a bottom surface 22 of the ring-type recess 30 accommodating the positioning plate 6 therein. The second concave portion 24 is formed on a surface of the positioning plate 6 opposed to the bottom surface 22. The second concave portion 24 has a shape including a part of a hemisphere and an inclined surface 26 adjoined to each other. As shown in FIG. 2, when viewed in the axial direction of the housing 1, the second concave portion 24 has an entire shape of a droplet.

Subsequently, an operation of the gap adjusting mechanism of a wet brake according to the first embodiment of the present invention will be described. It is assumed a case of adjusting the gap G formed between the disks 4 and the piston 5 of the wet brake. First, a brake pedal (not shown) is pressed to inject the pressure oil into the piston chamber, so that the piston 5 is caused to move toward the disks 4 so as to be spaced apart from the positioning plate 6. Next, the fixing bolt 16 is released so as to enable the rotation of the lever 15 with respect to the second housing portion B. Also, the lock nut 20 is released so as to enable the rotation of the regulating bolt 19 about its axis. Here, the lever 15 can be rotated in an angle range corresponding to a length of the slot 17 without taking off the fixing bolt 16 from the screw hole of the second housing portion B.

In this state, the regulating bolt 19 is caused to rotate about its axis to move forward with respect to the protrusion portion 18, thus the lever 15 is caused to rotate about the shaft portion 13 in a counterclockwise direction of FIG. 4. As a result, the shaft portion 13 of the adjusting member 8 rotates together with the lever 15, thereby the convex portion 9 of the adjusting member 8 also rotates about the shaft portion 13. Then, owing to the rotation of the convex portion 9, the positioning plate 6 is rotated in a clockwise direction of FIG. 2 inside the ring-type recess 30.

Figure 5B:
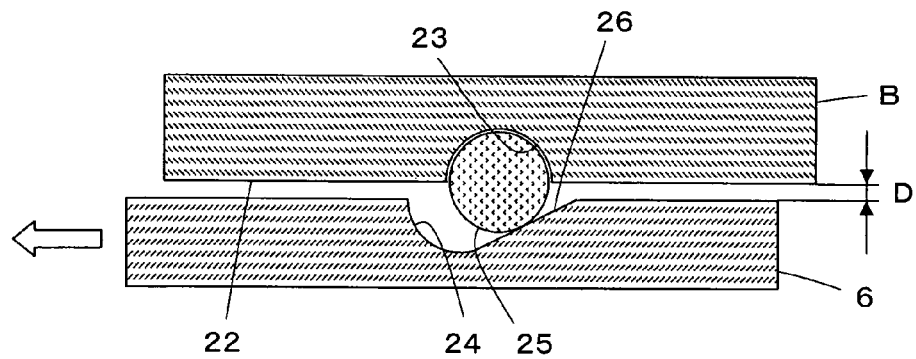

In other words, the positioning plate 6 slides with respect to the bottom surface 22 of the ring-type recess 30. Accordingly, the gap forming member 10 shifts from a state shown in FIG. 5A to a state shown in FIG. 5B. That is, the ball body 25 fitted in the first concave portion 23 of the bottom surface 22 of the ring-type recess 30 shifts from the state of abutting against a spherical surface of the second concave portion 24 of the positioning plate 6 to the state of abutting the inclined surface 26 of the second concave portion 24. As a result, an interval D is formed between the bottom surface 22 of the ring-type recess 30 and the positioning plate 6. Accordingly, the positioning plate 6 moves toward the first housing portion A by the interval D. That is, a return position of the piston 5 moves toward the first housing portion A. As a result, the gap G formed between the disks 4 and the piston 5 is reduced by the interval D.

Meanwhile, when the lever 15 is caused to rotate about the shaft portion 13 in a clockwise direction of FIG. 4, the gap G formed between the disks 4 and the piston 5 can be enlarged.

As described above, by rotating the lever 15, it is possible to adjust the gap G formed between the disks 4 and the piston 5. The size of the gap G corresponds to the rotational position of the lever 15.

Further, the end surface 21 of the lever 15 is abutted against the tip end portion of the regulating bolt 19, so that the rotational position of the lever 15 is maintained. Thus, the gap G formed between the disks 4 and the piston 5 can be defined to have a desired size.

In addition, the lever 15 abuts against the regulating bolt 19 as described above, so that it is possible to prevent the lever 15 from rotating in the clockwise direction of FIG. 4, i.e., in a direction that leads the gap G between the disks 4 and the piston 5 to be enlarged.

After the gap adjustment, the regulating bolt 19 is fastened by both the lock nut 20 and the screw hole of the protrusion portion 18 to fix the rotational position of the regulating bolt 19 about its axis. Accordingly, it is possible to prevent the regulating bolt 19 from rotating about its axis to move forward/backward with respect to the protrusion portion 18.

Further, by screwing the fixing bolt 16 into the screw hole of the second housing portion B, a peripheral portion of the slot 17 of the lever 15 is sandwiched between the base end portion of the fixing bolt 16 and the surface 31 of the second housing portion B. Accordingly, the lever 15 may be fixed to a desired rotational position.

As described above, the moving position of the regulating bolt 19 is fixed owing to the locknut 20, and also the lever 15 is directly fixed to the second housing portion B by the fixing bolt 16. Accordingly, the rotational position of the lever 15 is double-locked. Thus, the rotational position of the lever 15 may be firmly fixed.

As a result, the gap G formed between the disks 4 and the piston 5 may be reliably maintained at an adjusted value. Accordingly, it is possible to eliminate problems such as actuation delay and dragging of the brake caused by changes of the gap G between the disks 4 and the piston 5 from the adjusted value.

Further, even in a case where the lock nut 20 releases, the rotational position of the lever 15 is fixed by the fixing bolt 16. Thus, the gap G formed between the disks 4 and the piston 5 may be maintained at the adjusted value.

In addition, even in a case where the fixing bolt 16 releases, the lever 15 abuts against the tip end portion of the regulating bolt 19, and the forward/backward position of the lever 15 with respect to the protrusion portion 18 of the regulating bolt 19 is fixed owing to the lock nut 20. Therefore, the lever 15 may move in a direction that leads the gap G between the disks 4 and the piston 5 to become smaller than the adjusted value, but is prevented from moving in the direction that leads the gap G to become larger than the adjusted value. Thus, the actuation delay or the like of a brake caused by the loosening of the fixing bolt 16 is prevented from occurring.

By rotating the regulating bolt 19 about its axis to move forward/backward with respect to the protrusion portion 18, the lever 15 is rotated by the rotational angle depending on the moving amount of the regulating bolt 19. Thereby, the gap G formed between the disks 4 and the piston 5 may be adjusted. Accordingly, the gap G can be adjusted with high precision, to thereby, for example, set an effect of a brake or feeling in pressing a brake pedal optimum.

Further, the end surface 21 of the lever 15 has an arc shape, so that the tip end portion of the regulating bolt 19 abuts against the end surface 21 of the lever 15 vertically irrespective of the rotational position of the lever 15. Thus, by use of the regulating bolt 19, the lever 15 can be readily pressed and moved forward to rotate. Further, by the regulating bolt 19, the lever 15 can be effectively prevented from rotating in the direction that leads the gap G to be enlarged.

Second Embodiment

Subsequently, with reference to FIG. 6, a gap adjusting mechanism according to a second embodiment of the present invention will be described. Components and members similar to those in the first embodiment are represented by similar reference symbols. In the gap adjusting mechanism according to the first embodiment of the present invention, the fixing bolt 16 inserted into the slot 17 of the lever 15 fixes the rotational position of the lever 15. Instead of this structure, in the gap adjusting mechanism according to the second embodiment of the present invention, an abutting member 42 is abutted against a lever 41 from the opposite side of the regulating bolt 19 in a rotational direction of the lever 41 to fix a rotational position of the lever 41. Similarly to the lever 15 according to the first embodiment, the lever 41 includes the arc-shaped end surface 21 in the part against which the regulating bolt 19 abuts.

The abutting member 42 has a flat surface portion extending in parallel with the surface 31 of the second housing portion B, and a perpendicular portion vertically standing up from an end portion of the flat surface portion. Thus, the abutting member 42 has a substantially L-shaped cross-section. The perpendicular portion of the abutting member 42 abuts against the lever 41, to thereby regulate the rotation of the lever 41 in a counterclockwise direction of the FIG. 6. A slot 43 is formed in the flat surface portion of the abutting member 42. A fixing bolt 44 is inserted into the slot 43 to be screwed into a screw hole formed on the surface 31 of the second housing portion B. Therefore, by the fixing bolt 44, the abutting member 42 is fixed to the second housing portion B. Note that by releasing the fixing bolt 44, the abutting member 42 can be allowed to slide with respect to the fixing bolt 44 within a length of the slot 43.

In the gap adjusting mechanism having the structure as described above, the end surface 21 of the lever 41 is abutted against the tip end portion of the regulating bolt 19, to thereby regulate a rotational position of the lever 41 at a desired position. In addition, with the abutting member 42 abutting against the end surface of the lever 41 opposite to the regulating bolt 19, the fixing bolt 44 is fastened to fix the abutting member 42 to the second housing portion B.

Owing to the regulating bolt 19 and the abutting member 42, the rotation of the lever 41 is regulated from both sides. As a result, the lever 41 can be firmly fixed at the desired rotational position. Accordingly, similarly to the first embodiment as described above, the gap G formed between the disks 4 and the piston 5 may be reliably maintained at the adjusted value.

In addition, in the second embodiment of the present invention, there is no need to provide a slot to the lever 41. Thus, the lever 41 has a simple shape, so the lever 41 is readily manufactured.

Figure 6:
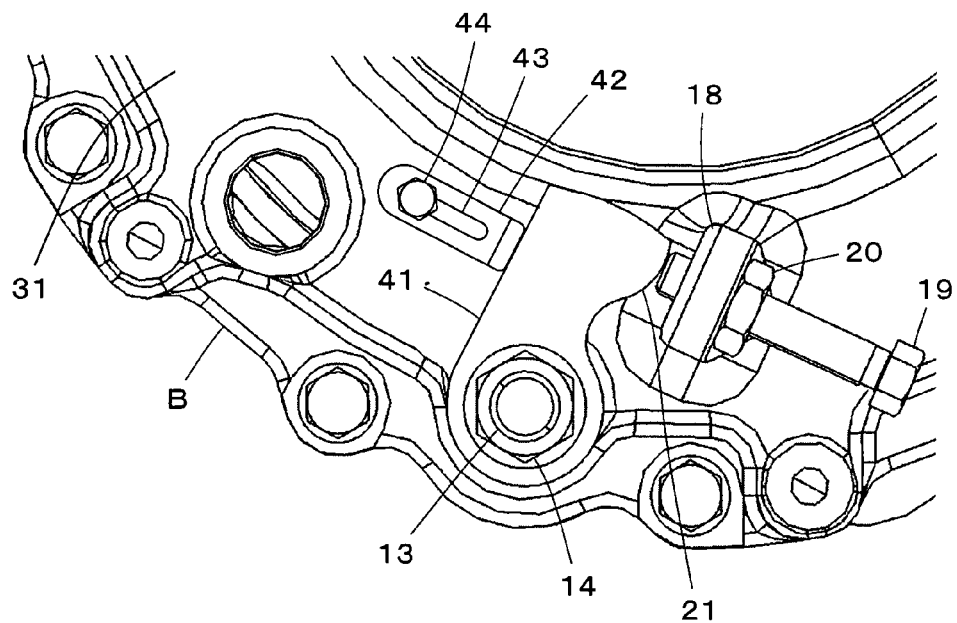
FIG. 6 is an enlarged front view showing a structure in the vicinity of a lever in a second embodiment of the present invention.

Note that, in the above-mentioned first and second embodiments of the present invention, when the lever 15 and 41 is rotated in the counterclockwise direction of FIG. 4 and FIG. 6, the gap G formed between the disks 4 and the piston 5 maybe reduced. On the contrary, the gap adjusting mechanism may be structured as follows. That is, when the lever 15 is rotated in the counterclockwise direction of FIG. 4, or when the lever 41 is rotated in the counterclockwise direction of FIG. 6, the gap G formed between the disks 4 and the piston 5 may be enlarged.

Further, in the first embodiment and the second embodiment of the present invention, when the shaft portion 13 of the adjusting member 8 rotates, the gap G is adjusted via the convex portion 9 of the adjusting member 8, the positioning plate 6, the gap forming member 10, and the like. However, the structure is not limited thereto. The present invention can be applied to any mechanism in which a gap G formed between disks 4 and a piston 5 is adjusted by rotating an adjusting member integrally fixed to a lever 15 or 41.

What is claimed is:

1. A gap adjusting mechanism of a wet brake, comprising:
   an adjusting member having a shaft portion which penetrates a housing of the wet brake and is rotatably disposed about an axis thereof and a convex portion which is formed on one end portion of the shaft position, the one end portion of the shaft portion inserted into the housing and another end portion of the shaft portion disposed outside of the housing;
   gap adjusting means accommodated in the housing, the gap adjusting means engaged with the convex portion of the adjusting member for adjusting a gap formed between a disk and a piston of the wet brake owing to rotation of the adjusting member, the disk and the piston accommodated in the housing;
   a lever fixed to another end portion of the shaft portion of the adjusting member, the lever rotating together with the shaft portion;
   a regulating bolt screwed into a screw hole formed in the housing, the regulating bolt moving forward/backward with respect to the screw hole by being rotated about an axis thereof for regulating a rotational position of the lever with a tip end portion of the regulating bolt abutting against the lever in a rotational direction of the lever;
   a regulating bolt fixing member capable of fixing a forward/backward position of the regulating bolt with respect to the screw hole; and
   a fixing bolt capable of fixing a rotational position of the lever with respect to the housing,
   wherein the lever includes a slot elongated in a rotational direction thereof, and the fixing bolt is capable of being inserted into the slot for fixing the lever to the housing, and
   wherein the gap adjusting means includes:
      a positioning plate for regulating a return position of the piston by abutting against the piston from the opposite side of the disk, the positioning plate having a cutout engaged with the convex portion of the adjusting member, the positioning plate rotated in a circumferential direction of the positioning plate due to the rotation of the adjusting member; and
      at least one gap forming member engaged with the positioning plate for adjusting the gap formed between the disk and the piston by moving the positioning plate in an axial direction of the positioning plate due to the rotation of the positioning plate in the circumferential direction of the positioning plate.

2. A gap adjusting mechanism of a wet brake according to claim 1, wherein the tip end portion of the regulating bolt abuts against the lever so that the lever and the adjusting member are prevented from rotating to directions leading the gap formed between the disk and the piston to be enlarged.

3. A gap adjusting mechanism of a wet brake according to claim 1, wherein the regulating bolt fixing member comprises a lock nut for fastening the regulating bolt together with the screw hole to thereby fix the forward/backward position of the regulating bolt with respect to the screw hole.

4. A gap adjusting mechanism of a wet brake according to claim 1, wherein the lever has an arc-shaped end surface against which the tip end portion of the regulating bolt abuts vertically irrespective of the rotational position of the lever.

5. A gap adjusting mechanism of a wet brake according to claim 1, wherein the housing includes a protrusion portion protruding from an outer surface of the housing,
   the screw hole is penetratingly formed to the protrusion portion in parallel with the outer surface of the housing, and
   the regulating bolt is screwed into the screw hole, the tip end portion of the regulating bolt abutting against the lever.

6. A gap adjusting mechanism of a wet brake according to claim 1, wherein the gap adjusting means comprises a plurality of gap forming members disposed in the circumferential direction of the positioning plate at identical intervals.

* * * * *